United States Patent
Burgess

(10) Patent No.: US 11,360,994 B1
(45) Date of Patent: Jun. 14, 2022

(54) COMPACT STORAGE OF NON-SPARSE HIGH-DIMENSIONALITY DATA

(71) Applicant: Amazon Technologies, Inc., Seattle, WA (US)

(72) Inventor: Giles Jonathan Burgess, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 678 days.

(21) Appl. No.: 15/216,593

(22) Filed: Jul. 21, 2016

(51) Int. Cl.
    *G06F 16/00* (2019.01)
    *G06F 16/25* (2019.01)
    *G06F 16/28* (2019.01)
    *G06F 16/2455* (2019.01)

(52) U.S. Cl.
    CPC ........ *G06F 16/254* (2019.01); *G06F 16/2455* (2019.01); *G06F 16/283* (2019.01)

(58) Field of Classification Search
    CPC ........ G06F 17/30563; G06F 17/30477; G06F 17/30592; G06F 17/30569; G06F 17/30595; G06F 16/254; G06F 16/2455; G06F 16/283; G06F 16/58; G06F 17/30; G06Q 10/10
See application file for complete search history.

(56) References Cited

U.S. PATENT DOCUMENTS

| | | | |
|---|---|---|---|
| 8,326,820 B2 | 12/2012 | Li et al. | |
| 8,363,961 B1 | 1/2013 | Avidan et al. | |
| 8,365,081 B1* | 1/2013 | Amacker | H04L 65/607 |
| | | | 715/748 |
| 8,379,806 B2 | 2/2013 | Wu et al. | |
| 8,407,164 B2 | 3/2013 | Malik et al. | |
| 8,908,978 B2 | 12/2014 | Oka et al. | |
| 11,194,808 B1* | 12/2021 | Adams | G06F 16/2456 |
| 2004/0215626 A1* | 10/2004 | Colossi | G06F 16/24542 |
| 2005/0177553 A1* | 8/2005 | Berger | G06F 16/283 |
| 2010/0049707 A1* | 2/2010 | Faria | G06F 16/58 |
| | | | 707/749 |
| 2017/0147674 A1* | 5/2017 | Procops | G06F 16/148 |
| 2017/0235436 A1* | 8/2017 | Hooton | H04L 67/10 |
| | | | 705/7.11 |

* cited by examiner

*Primary Examiner* — Ashish Thomas
*Assistant Examiner* — Suman Rajaputra
(74) *Attorney, Agent, or Firm* — Robert C. Kowert; Kowert, Hood, Munyon, Rankin & Goetzel, P.C.

(57) ABSTRACT

Methods, systems, and computer-readable media for compact storage of non-sparse high-dimensionality data are disclosed. A data store comprises a plurality of records, and the plurality of records represent a space having n dimensions of ordered input values. The space is partitioned into a plurality of non-overlapping segments having the n dimensions. Individual ones of the records correspond to individual ones of the segments. A query is received that comprises one or more input values for at least some of the n dimensions of the space. At least one record is retrieved from the data store based at least in part on the query. The record corresponds to one of the segments in the space, and the record comprises content responsive to the query.

20 Claims, 9 Drawing Sheets

COMPACT STORAGE OF NON-SPARSE HIGH-DIMENSIONALITY DATA

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

For example, web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies information about the item, such as a description of the item, one or more pictures of the item, as well as specifications (e.g., weight, dimensions, capabilities) of the item. Additionally, a marketplace may offer other types of pages to potential customers, such as a home page that introduces a customer to the marketplace and a search page that lists products relevant to one or more search terms. The pages may be generated dynamically upon receipt of appropriate requests from consumers. In some circumstances, a detail page for a particular product may be generated based on a complex set of configuration data. As the number of products offered in the marketplace increases, storage and retrieval of such configuration data may become increasingly challenging.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for compactly storing non-sparse high-dimensionality data are described. Using the techniques described herein, data having a potentially high number of dimensions n may be stored efficiently in a data store. The data may include configuration data for generating detail pages for products offered by an online merchant, and the dimensions may include the marketplace or region in which a product is offered, the product category for the product, the device type on which the page will be displayed, and so on. Instead of representing each potential combination of values for each of the dimensions as a separate record in a data store, the number of which may run into the millions or billions or beyond, each record may instead represent a shared set of configuration data for multiple values of at least some of the dimensions. For example, the same record may represent a common set of configuration data for a range of marketplaces, a range of product categories, a range of target device types, and/or any other suitable range of input values for the n dimensions. Values for a particular one of the n dimensions may be ordered so that the elements corresponding to those values are organized in the n-dimensional space based on similarity. For example, similar product categories may be mapped to ordinal values and ordered contiguously on their dimension so that the same record can represent configuration data across a contiguous range of similar product categories. By dividing an n-dimensional space into non-overlapping iso-valued segments (e.g., non-overlapping rectangles for n=2, non-overlapping rectangular cuboids for n=3, and non-overlapping hyperrectangles for n>3), each of which may correspond to a single record in a data store, the number of records to be stored may be reduced significantly.

Figure 1:
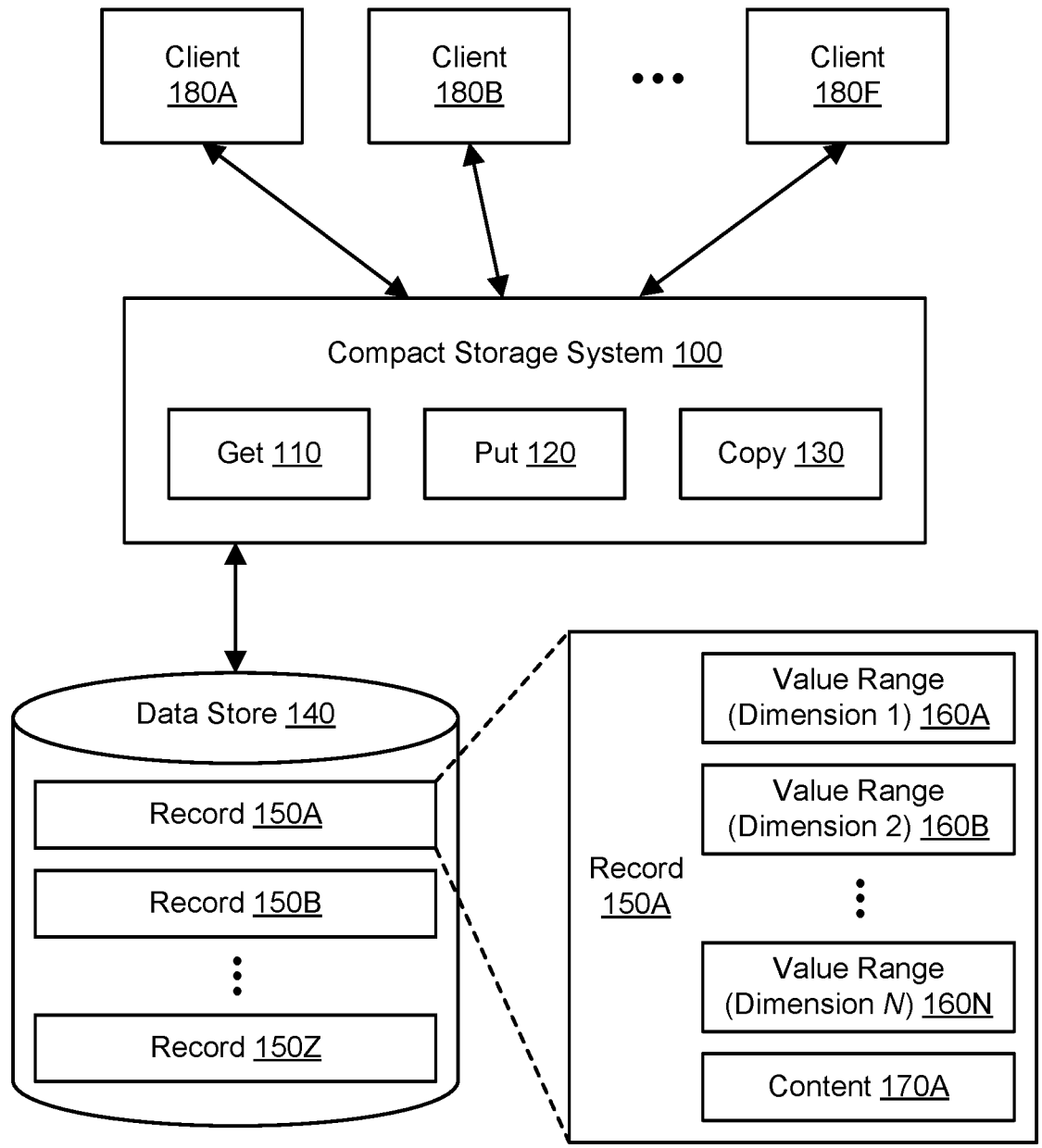
FIG. 1 illustrates an example system environment for compactly storing non-sparse high-dimensionality data, according to one embodiment.

FIG. 1 illustrates an example system environment for storing non-sparse high-dimensionality data, according to one embodiment. The example system environment may comprise a compact storage system 100 that manages the efficient storage of records representing segments of an n-dimensional space. The storage system 100 may interact with a data store 140 that stores records such as records 150A and 150B through 150Z. Although three records 150A, 150B, and 150Z are shown for purposes of illustration and example, it is contemplated that any suitable number and configuration of records may be used with the compact storage system 100. The records 150A-150Z may store any suitable content, such as configuration information for generating web pages. In such an example, the n dimensions may relate to properties of the web pages. The dimensions may be of any suitable number n; due to the efficiency of the storage system 100, records having a large number of dimensions may be maintained without the need to store an individual record for each combination of values across all the n dimensions. In one embodiment, the n-dimensional space may be partitioned into disjoint (non-overlapping) segments, and individual segments of the n-dimensional space may correspond to individual records in the data store 140. The data store 140 may represent a multi-dimensional associative array. The data store 140 may be implemented using any suitable storage technologies, e.g., as a key-value data store, a relational data store, and/or a data store that is accessible using structured query language (SQL) queries.

In one embodiment, the storage system 100 may communicate with clients 180A-180F using one or more networks, potentially including the Internet. One or more of the clients 180A-180F may represent external systems or entities, such as a web server that seeks to obtain web page configuration information from the data store 140. The storage system 100 may include a plurality of different instances that are distributed throughout one or more networks, and each instance may offer access (e.g., read access) to a copy of the records 150A-150Z. The copies of the records 150A-150Z may be distributed from a centralized data store, and updates to the records may be made to the centralized data store and then promulgated to the copies. One or more of the clients 180A-180F may represent co-located systems or entities with respect to an instance of the storage system 100. For example, a web server that uses the storage system 100 to generate web pages may be located on the same host as an instance of the storage system. An instance of the data store 140 may also be co-located with respect to an instance of the storage system 100.

Upon receiving suitable requests from clients 180A-180F, the storage system 100 may perform operations on the data store 140 such as get 110, put 120, and copy 130. The get operation 110 may retrieve one or more of the records 150A-150Z, e.g., based on values for one or more of the n dimensions as supplied with a query. In one embodiment, the get operation 110 may be of the form "get <property-name> where {<discriminant-set>}," where the discriminant set is chosen from a predefined set of allowable values (keys) for the n dimensions. The put operation 120 may store one or more records in the data store 140. In one embodiment, the put operation 120 may be of the form "put <property-name>=<value> where {<discriminant-set>}." In one embodiment, the copy operation 130 may be of the form "copy <property-name> to {<discriminant-set>} from {<discriminant-set>}." A wider range of the clients 180A-180F may be permitted to invoke the get operation 110 than the put operation 120 and copy operation 130.

A record 150A in the data store 140 may represent a segment of the n-dimensional space that encompasses ranges of values for the various dimensions. A segment may contain content that is common to all the values within the ranges of values for the n dimensions. As shown in the example of FIG. 1, the record 150A may contain content 170A that is common to a range of values 160A for a first dimension, a range of values 160B for a second dimension, and a range of values 160N for an nth dimension (and potentially the ranges of values for any dimensions between the second and the nth). A range of values for a dimension may include one or more values. Values for a dimension may be ordered, and multiple values in the range associated with a particular record may be contiguous in the ordered sequence for that dimension. Non-numeric values for a dimension may be mapped to ordinal values. For example, if a dimension relates to a product category (e.g., with allowable values such as "books," "clothing," "electronics," and so on), then the product categories may be mapped to numerals. The product categories may also be ordered based on similarity. The similarity may relate to the likelihood that the content of a particular record will apply to both keys. For example, similar categories such as "books" and "e-books" may be associated with adjacent ordinal values on a "product category" dimension. As another example, similar categories such as "tablet" and "smartphone" may be associated with adjacent ordinal values on a "device type" dimension. The n-dimensional space may not be sparse, such that the space may include a variety of values and not be mostly empty. By organizing and ordering the dimensions based on similarity, the number of segments in the n-dimensional space may be reduced, and so too may the number of records in the data store 140.

The storage system 100 may include various components, modules, or functionalities, such as components to implement the get operation 110, put operation 120, and copy operation 130. The storage system 100 may be implemented using any suitable number and configuration of computing devices, any of which may be implemented by the example computing device 3000 illustrated in FIG. 8. The computing devices may be located in any suitable number of data centers or geographical locations. In various embodiments, the functionality of the different components of the storage system 100 may be provided by the same computing device or by different computing devices. If any of the components of the storage system 100 are implemented using different computing devices, then the components and their respective computing devices may be communicatively coupled, e.g., via one or more networks. Each of the components of the storage system 100 may represent any combination of software and hardware usable to perform their respective functions, as discussed as follows. Operations implemented by the storage system 100 may be performed automatically, e.g., without a need for user initiation or user intervention after an initial configuration stage, and programmatically, e.g., by execution of program instructions on at least one computing device. It is contemplated that the storage system 100 may include additional components not shown, fewer components than shown, or different combinations, configurations, or quantities of the components shown. The client devices 180A-180F may be implemented using any suitable number and configuration of computing devices, any of which may be implemented by the example computing device 3000 illustrated in FIG. 8. Although three client devices 180A, 180B, and 180F are illustrated for purposes of example, it is contemplated that any suitable number and configuration of customer devices may interact with the storage system 100.

Figure 2:
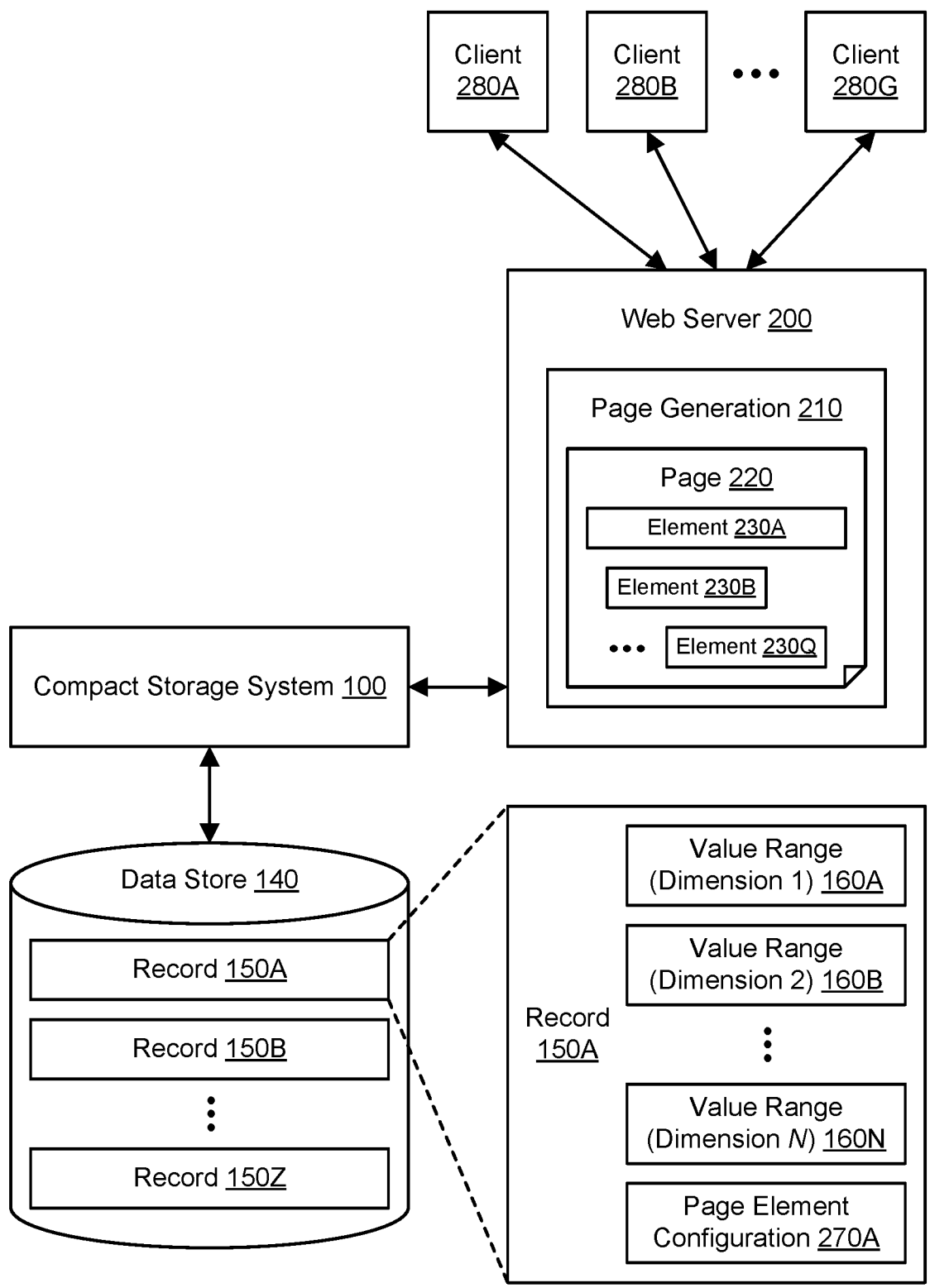
FIG. 2 illustrates further aspects of the example system environment for compactly storing non-sparse high-dimensionality data, including a web server configured to generate web pages based (at least in part) on multi-dimensional configuration information stored in the data store, according to one embodiment.

FIG. 2 illustrates further aspects of the example system environment for storing non-sparse high-dimensionality data, including a web server configured to generate web pages based (at least in part) on multi-dimensional configuration information stored in the data store, according to one embodiment. The example system environment may comprise a web server 200 that generates web pages and delivers the pages to client devices 280A-280G. The web server 200 may communicate with the clients 280A-280G using one or more networks, potentially including the Internet. The web server 200 may receive requests for web pages from the clients 280A-280G, generate the web pages based (at least in part) on data retrieved from the data store 140 by the compact storage system 100, and send the web pages to the requesting clients. The term "web page" (or "page") is intended to include any sets of code and/or data suitable for implementing a structured multimedia format (e.g., including text and/or graphics) that is displayable in a browser program and/or a dedicated application provided by or on behalf of a merchant or other entity. Accordingly, the term "web page" (or "page") may include, but is not limited to, HTML-based formats and other markup-language-based formats. In general, a web page may permit user interaction, e.g., by a user selecting one or more links or other interactive elements to view product-related information and/or engage in transactions related to goods or services offered by a merchant.

The web server 200 and/or compact storage system 100 may be operated by or on behalf of an internet-based merchant or other online entity. For example, the web server 200 may generate various types of web pages that permit customers to search for products in a product catalogue, browse product categories, view detailed information for particular products, purchase particular products, or engage in other types of transactions with a merchant. The client devices 280A-280G may be operated by or on behalf of customers of the merchant. As used herein, the term "customer" is intended to include entities that have previously engaged in transactions with a merchant or other entity (e.g., for the sale or lease of goods and/or services) and also entities that may potentially engage in such transactions in the future. The client devices 280A-280G may vary in type and configuration. The client devices 280A-280G may be implemented using any suitable number and configuration of computing devices, any of which may be implemented by the example computing device 3000 illustrated in FIG. 8. Although three client devices 280A, 280B, and 280G are illustrated for purposes of example, it is contemplated that any suitable number and configuration of customer devices may interact with the web server 200.

The web server 200 may include various components, modules, or functionalities such as a page generation component 210. The page generation component 210 may generate a page 220 in response to a request from one of the clients 280A-280G. Generated pages may include pages suitable for allowing customers to browse products offered by a merchant or engage in transactions with the merchant, e.g., home pages, product detail pages, product category pages, search result pages, shopping cart pages, post-checkout pages, and/or other suitable types of pages. The page 220 may include a plurality of elements, e.g., display elements and/or interaction elements. As shown in the example of FIG. 2, the page 220 may be generated with elements 230A and 230B through 230Q. The elements 230A-230Q may be located in particular positions relative to one another in the page 220.

The elements 230A-230Q may represent different ways of visualizing or displaying content in a web page. For example, the elements 230A-230Q may include various configurations for displaying product information (e.g., text and/or image data), lists of products or promotions, tiled displays of products or promotions, and other suitable ways of showing content. A particular element may also be configured for particular types of input, e.g., for display and user interaction on touch-sensitive devices. A particular element may be configured to change dynamically based on interaction with the user, e.g., to display additional items of content or drill down on a selected item. The elements 230A-230Q may be selected from a set of potential elements on any suitable basis and based (at least in part) configuration data in the data store 140. In one embodiment, the elements 230A-230Q may be included in the page 220 based (at least in part) on configuration data managed by the compact storage system 100 and stored in the data store 140, while other elements may be excluded from the page 220 based (at least in part) on the configuration data. In one embodiment, the positions of the elements 230A-230Q in the page 220 may be determined based (at least in part) on configuration data managed by the compact storage system 100 and stored in the data store 140.

In one embodiment, the page 220 may be associated with values in at least some of then dimensions of the records 150A-150Z in the data store 140. For example, one dimension may represent values for marketplaces or regions (e.g., nations, states, continents, or other regions defined by political or geographical boundaries) of the online merchant, and the request for the page may be associated with one of those marketplaces or regions. As another example, one dimension may represent values for product categories (also referred to herein as website display groups), and the requested page may relate to a particular product that is associated with one or more of those product categories. As yet another example, one dimension may represent values for device types on which pages are to be displayed, and the request for the page may be associated with a device type (or family of device types), e.g., a desktop computer, laptop computer, tablet, smartphone, wearable computer, and so on. The web server 200 may generate the page 220 to be displayed on the particular device type associated with the request.

A record 150A in the data store 140 may represent a segment of the n-dimensional space that encompasses the values for these various dimensions that are associated with the request and/or the page 220. The record 150A may include page element configuration data 270A that dictates or influences the generation of the page 220. In one embodiment, the record 150A may include configuration data 270A for a particular one of the elements 230A-230Q, e.g., an indication as to whether the particular element should be displayed in the page, and if so, its position relative to other elements. In one embodiment, each element that is considered for inclusion in the page 220 may have its own set of records in the data store 140; in generating the page 220, many records may potentially be retrieved to determine configuration data for many elements, based (at least in part) on the values for the n dimensions associated with the request. As will be discussed in greater detail below, the n-dimensional space may be partitioned into disjoint (non-overlapping) segments whose boundaries are defined by values for the various dimensions, and each segment may correspond to a record in the data store 140.

The web server 200 may be co-located with an instance of the storage system 100 and with a read-only copy of the data store 140. The web server 200 may be implemented using any suitable number and configuration of computing devices, any of which may be implemented by the example computing device 3000 illustrated in FIG. 8. The computing devices may be located in any suitable number of data centers or geographical locations. In various embodiments, the functionality of the different components of the web server 200 may be provided by the same computing device or by different computing devices. If any of the components of the web server 200 are implemented using different computing devices, then the components and their respective computing devices may be communicatively coupled, e.g., via one or more networks. Each of the components of the web server 200 may represent any combination of software and hardware usable to perform their respective functions, as discussed as follows. Operations implemented by the web server 200 may be performed automatically, e.g., without a need for user initiation or user intervention after an initial configuration stage, and programmatically, e.g., by execution of program instructions on at least one computing device. It is contemplated that the web server 200 may include additional components not shown, fewer components than shown, or different combinations, configurations, or quantities of the components shown.

In some embodiments, the compact storage system 100 and/or web server 200 may implement a service-oriented architecture and may include multiple services configured to communicate with each other (e.g., through message passing) to carry out various tasks. For example, a service may be configured to retrieve input data from one or more storage locations and/or from a service request, transform or otherwise process the data, and generate output data. In some cases, a first service may call a second service, the second service may call a third service to satisfy the request from the first service, and so on. To build a web page dynamically based on data retrieved from the data store 140, numerous services may be invoked in a hierarchical manner to build various components of the web page. The services may be configured to process requests from various internal or external systems, such as other components of the web server 200 and/or client devices 280A-280G. For instance, a person operating a web browser on a client device 280A-280G may submit a request for data, e.g., data associated with a product detail page, a shopping cart application, a checkout process, a search query, etc.

In one embodiment, the data store 140 may be implemented as an SQLITE database file during a build process for the records 150A-150Z. Data may be exported from this initial format to production hosts such as web servers that render web pages. In the initial database, the use of a simple relational schema may permit automatic constraint checks on key values. For example, attempting to specify an invalid marketplace identifier may causes a foreign-key constraint error, and the build may fail. The initial database may also permit offline configuration analysis and auditing. When data is exported to another format, such as an R*Tree-derived hierarchical bounding volume tree for use in production hosts, that other format may support more restrictive key-value lookups and range queries to limit the potential for expensive queries.

Figure 3:
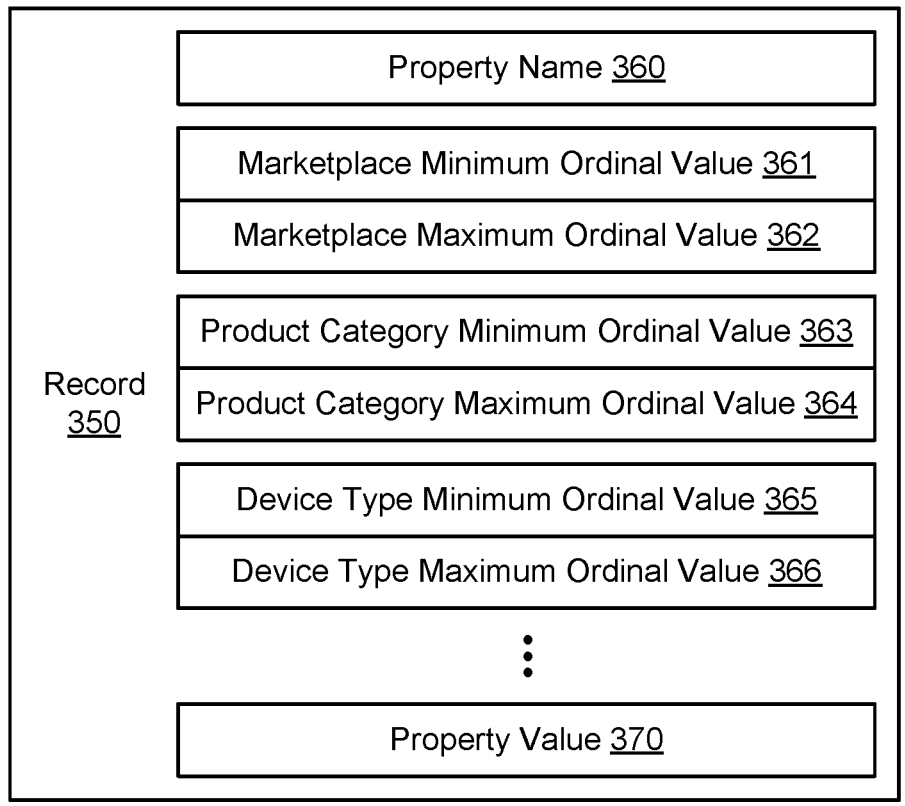
FIG. 3 illustrates an example of a data structure usable for compactly storing non-sparse high-dimensionality data, according to one embodiment.

FIG. 3 illustrates an example of a data structure usable for storing non-sparse high-dimensionality data, according to one embodiment. A record 350 in the data store 140 may represent a segment of the n-dimensional space that encompasses ranges of values for the various dimensions. A segment may contain content, such as a property name 360 and property value 370, that is common to all the values within the ranges of values for the n dimensions. In one embodiment, the record 350 may store configuration data usable for generating a web page, and the page may be associate with particular values for at least some of the n dimensions. In one embodiment, each of the n dimensions may include or be mapped to a set of ordinal values that are placed in a particular order (e.g., numerical order). For any of the n dimensions, the record 350 may include a minimum ordinal value and maximum ordinal value that together define the range of values. The minimum and maximum values may be the same, but the minimum may not be greater than the maximum.

For example, one dimension may represent values for marketplaces or regions (e.g., nations, states, continents, or other regions defined by political or geographical boundaries) of the online merchant, and those values may be mapped to ordinal values such as numerals. To place the record in a contiguous portion of the marketplace dimension, the record 350 may include a marketplace minimum ordinal value 361 and a marketplace maximum ordinal value 362, potentially representing a range with multiple marketplaces or regions. As another example, one dimension may represent values for product categories (also referred to herein as website display groups), such as "books," "clothing," "electronics," and so on. To place the record in a contiguous portion of the product category dimension, the record 350 may include a product category minimum ordinal value 363 and a product category maximum ordinal value 364, potentially representing a range with multiple product categories. As yet another example, one dimension may represent values for device types (e.g., families of device types and/or sub-types) on which pages are to be displayed, e.g., a desktop computer, laptop computer, tablet, smartphone, wearable computer, and so on. To place the record in a contiguous portion of the device type dimension, the record 350 may include a device type minimum ordinal value 365 and a device type maximum ordinal value 366, potentially representing a range with multiple device types. The record 350 may also include minimum and maximum ordinal values for any other dimensions. In some embodiments, other dimensions may relate to a product identifier of a product offered by a merchant, a variation set relation (with allowable values such as "parent" and "child"), a purchase status (with allowable values such as "purchased" and "not purchased"), and other suitable attributes of products or web pages related to products. In one embodiment, the property name 350 may represent another dimension of the n-dimensional space.

In one embodiment, the potential combinations of values for a marketplace dimension, a product category dimension, and a device type dimension may be in the tens of thousands. Rather than storing each such combination in its own record or database row, the compact storage system 100 may reduce the number of records or rows from tens of thousands to a mere few hundred if the keys for the dimensions can be ordinalized for sufficient compaction. As the number of dimensions or the number of keys increases, even greater savings may be achieved.

In one embodiment, a get operation on the data store 140 to retrieve the record 350 may be implemented as an SQL select operation, such as: select propertyValue from property_value_cube where propertyName=property and (market between marketplaceMinimumOrdinal and marketplaceMaximumOrdinal) and (category between categoryMinimumOrdinal and categoryMaximumOrdinal) and (devicetype between devicetypeMinimumOrdinal and devicetypeMaximumOrdinal). In one embodiment, an update operation on the data store 140 to update the record 350 may not be implemented as a simple SQL statement because any intersection with existing n-dimensional segments may require the overwritten segments to be clipped into multiple sub-segments. In one embodiment, to insert a new record, the following algorithm may be used:

```
to add record c
  for each record e where (e.bounds ∩ c.bounds)≠∅
    delete e
    for each sub-segment s in (e.bounds–c.bounds)
      insert new record {bounds ← s, value ← e.value}
  insert c
```

Figure 4A:
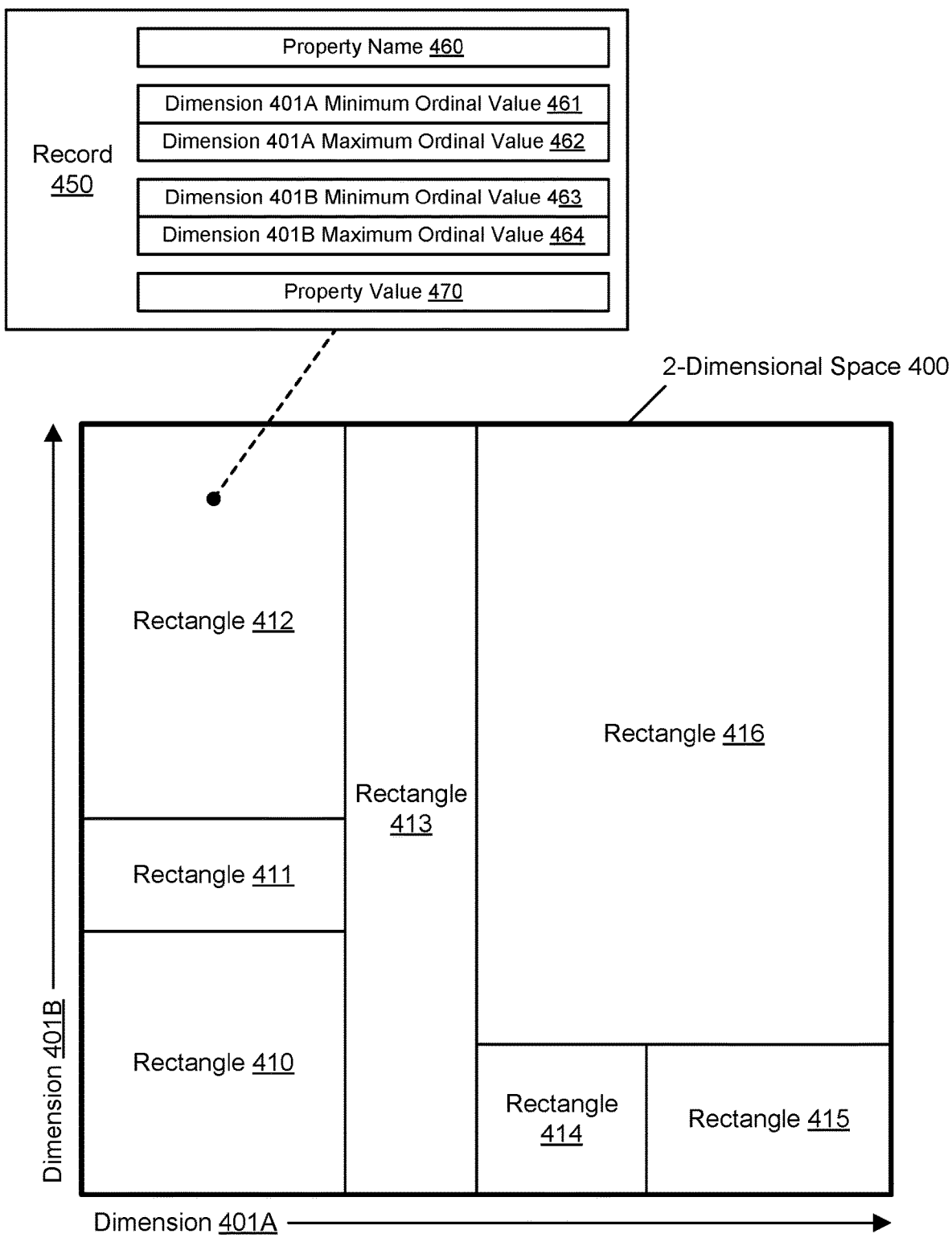
FIG. 4A and FIG. 4B illustrate examples of a two-dimensional space in which disjoint rectangles correspond to records in a data store, according to one embodiment.

FIG. 4A illustrates an example of a two-dimensional space in which disjoint rectangles correspond to records in a data store, according to one embodiment. FIG. 4A shows an example of a space 400 with two dimensions or a slice of a space with a higher number of dimensions. A first dimension 401A may include a set of ordinal values representing an ordered sequence of allowable keys. A second dimension 401B may include a different set of ordinal values representing an ordered sequence of allowable keys. As shown in the example of FIG. 4A, the space 400 may be partitioned into disjoint (non-overlapping) rectangles 410, 411, 412, 413, 414, 415, and 416. Any of the rectangles 410, 411, 412, 413, 414, 415, and 416 may represent multiple coordinates in the two dimensions 401A and 401B. Within a particular one of the rectangles 410, 411, 412, 413, 414, 415, or 416, a common set of data (e.g., website configuration data) may be shared by the values (keys) for the two dimensions 401A and 401B that are located within that rectangle.

In one embodiment, any one of the rectangles 410, 411, 412, 413, 414, 415, and 416 may be represented by a single record in the data store 140. For example, rectangle 412 may correspond to record 450. Record 450 may include the same property name 460 and the same property value 470 for all the coordinates within the corresponding rectangle 412. The record 450 may indicate (e.g., as key-value pairs) the range of values for the first dimension 401A using a minimum ordinal value 461 and a maximum ordinal value 462. The record 450 may indicate (e.g., as key-value pairs) the range of values for the second dimension 401B using a minimum ordinal value 463 and a maximum ordinal value 464.

Figure 4B:
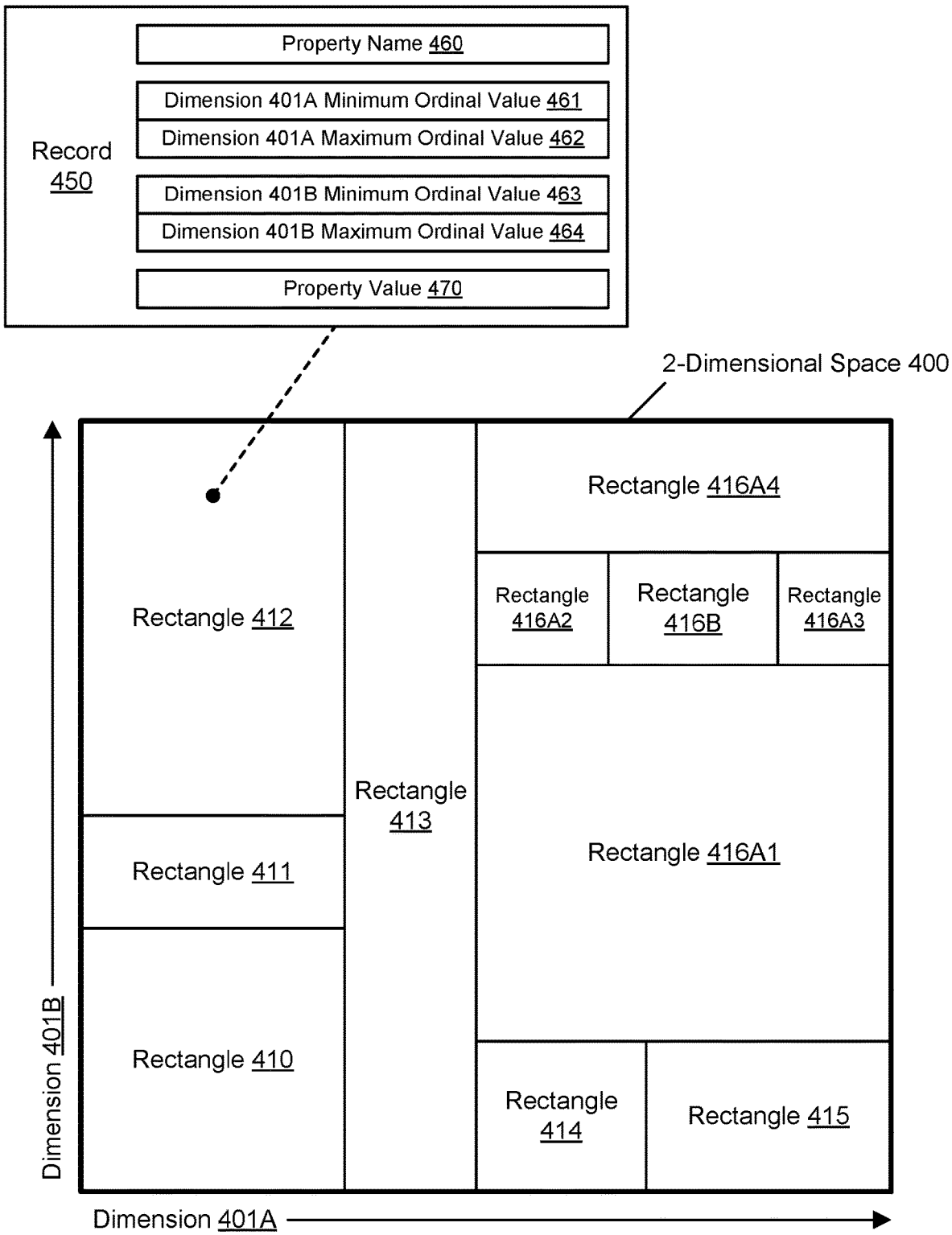

FIG. 4B illustrates a further example of a two-dimensional space in which disjoint rectangles correspond to records in a data store, according to one embodiment. As discussed above with respect to FIG. 3, an operation to insert a new record may include clipping existing segments into multiple sub-segments. As shown in the example of FIG. 4B, a new rectangle 416B may be inserted into the region previously occupied by the rectangle 416. The new rectangle 416B may represent different content (e.g., one or more values for website configuration data) in comparison to the original rectangle 416. The remaining portions of the rectangle 416 may be replaced by new rectangles 416A1, 416A2, 416A3, and 416A4 that represent the same shared content (e.g., one or more values for website configuration data) as the original rectangle 416. Any of the rectangles 416A1, 416A2, 416A3, 416A4, and 416B may represent a common or shared set of data for sets of coordinates within the particular rectangle. Each of the rectangles 416A1, 416A2, 416A3, 416A4, and 416B may correspond to a respective record that indicates the boundaries of the rectangle in both dimensions 410A and 410B. The clipping operation associated with insertion of the new rectangle 416B may be performed horizontally or vertically based on the order in which the dimensions 410A and 410B are traversed. In one embodiment, the clipping may begin in the dimension that has the most variation in values.

Figure 5:
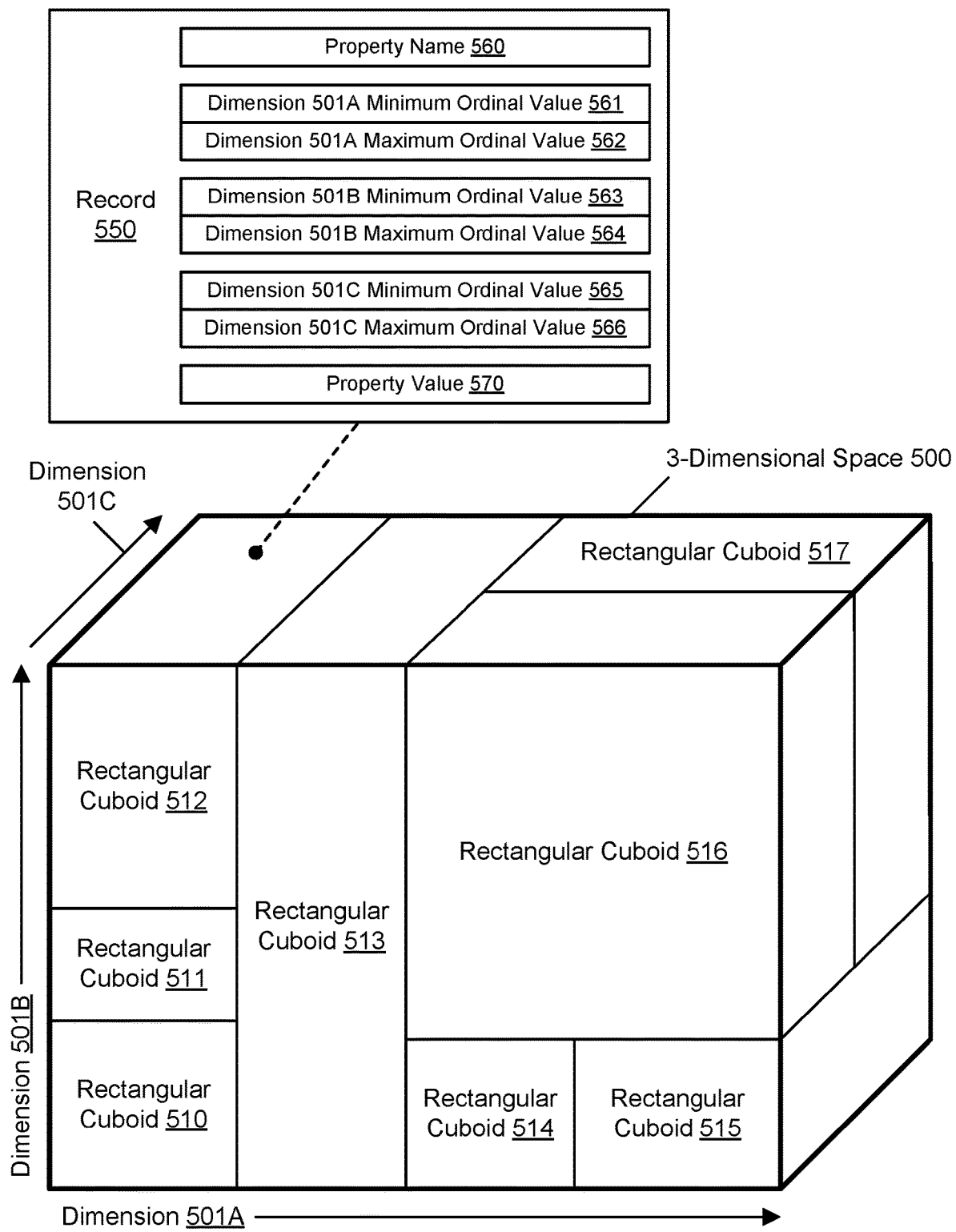
FIG. 5 illustrates an example of a three-dimensional space in which disjoint rectangular cuboids correspond to records in a data store, according to one embodiment.

FIG. 5 illustrates an example of a three-dimensional space in which disjoint rectangular cuboids correspond to records in a data store, according to one embodiment. FIG. 5 represents an expansion of the example two-dimensional space 400 into a three-dimensional space 500 that includes disjoint rectangular cuboids. Similarly, the n-dimensional space may be expanded to four or more dimensions, such that the disjoint segments that correspond to individual records may take the form of hypercubes or hyperrectangles. A first dimension 501A may include a set of ordinal values representing an ordered sequence of allowable keys. A second dimension 501B may include a different set of ordinal values representing an ordered sequence of allowable keys. A third dimension 501C may include yet another set of ordinal values representing an ordered sequence of allowable keys. As shown in the example of FIG. 5, the space 500 may be partitioned into disjoint (non-overlapping) rectangular cuboids 510, 511, 512, 513, 514, 515, 516, and 517. Any of the rectangular cuboids 510, 511, 512, 513, 514, 515, 516, and 517 may represent multiple coordinates in the three dimensions 501A, 501B, and 501C. Within a particular one of the rectangular cuboids 510, 511, 512, 513, 514, 515, 516, and 517, a common set of data (e.g., website configuration data) may be shared by the values (keys) for the three dimensions 501A-501C that are located within that rectangle.

In one embodiment, any one of the rectangular cuboids 510, 511, 512, 513, 514, 515, 516, and 517 may be represented by a single record in the data store 140. For example, rectangular cuboid 512 may correspond to record 550. Record 550 may include the same property name 560 and the same property value 570 for all the coordinates within the corresponding rectangular cuboid 512. The record 550 may indicate (e.g., as key-value pairs) the range of values for the first dimension 501A using a minimum ordinal value 561 and a maximum ordinal value 562. The record 550 may indicate (e.g., as key-value pairs) the range of values for the second dimension 501B using a minimum ordinal value 563 and a maximum ordinal value 564. The record 550 may indicate (e.g., as key-value pairs) the range of values for the third dimension 501C using a minimum ordinal value 565 and a maximum ordinal value 565.

Figure 6:
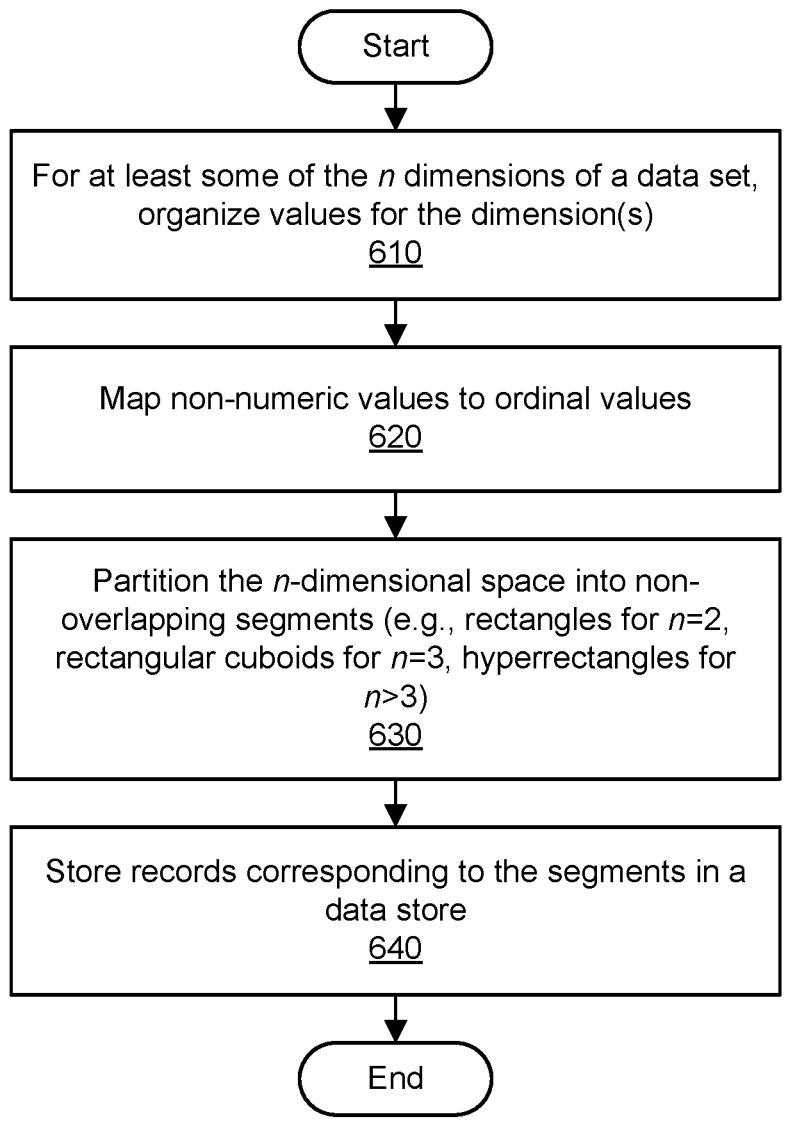
FIG. 6 is a flowchart illustrating a method for compactly storing non-sparse high-dimensionality data as records in a data store, according to one embodiment.

FIG. 6 is a flowchart illustrating a method for storing non-sparse high-dimensionality data as records in a data store, according to one embodiment. As shown in 610, for at least some of n dimensions of a data set, the allowable values (keys) for a dimension may be organized in a particular arrangement, e.g., by placing them in a particular order. For example, the keys for a dimension may be ordered based on similarity. The similarity may relate to the likelihood that the content of a particular record will apply to both keys. For example, similar product categories such as "books" and "e-books" may be associated with adjacent ordinal values on a "product category" dimension. As another example, similar categories such as "tablet" and "smartphone" may be associated with adjacent ordinal values on a "device type" dimension. By organizing and ordering the dimensions based on similarity or any other suitable basis, the number of segments in the n-dimensional space may be reduced, and so too may the number of records in the data store. As shown in 620, non-numeric values (if any) may be mapped to ordinal (e.g., numeric) values. For example, if a dimension relates to a product category (e.g., with allowable values such as "books," "clothing," "electronics," and so on), then the allowable alphanumeric strings describing the product categories may be mapped to an ordered set of numerals (e.g., 1, 2, 3, and so on) on that particular dimension. The mapping operation in 620 may respect the organization or order determined in 610 such that adjacent keys in the organizational scheme are mapped to adjacent numerals.

As shown in 630, the n-dimensional space may be partitioned into non-overlapping segments. If n=2, the segments may be rectangles; if n=3, the segments may be rectangular cuboids; and if n>3, the segments may be hyperrectangles. Within a segment, the share value(s) may be associated with the various coordinates located within that segment. For example, the same configuration values for an element of a web page may be shared for a combination of one or more values in two or more dimensions. As shown in 640, records corresponding to the segments may be stored in a data store. In one embodiment, each of the disjoint segments may correspond to a single record in the data store, such that the content of that record may be shared by all coordinates within that segment of the n-dimensional space.

Figure 7:
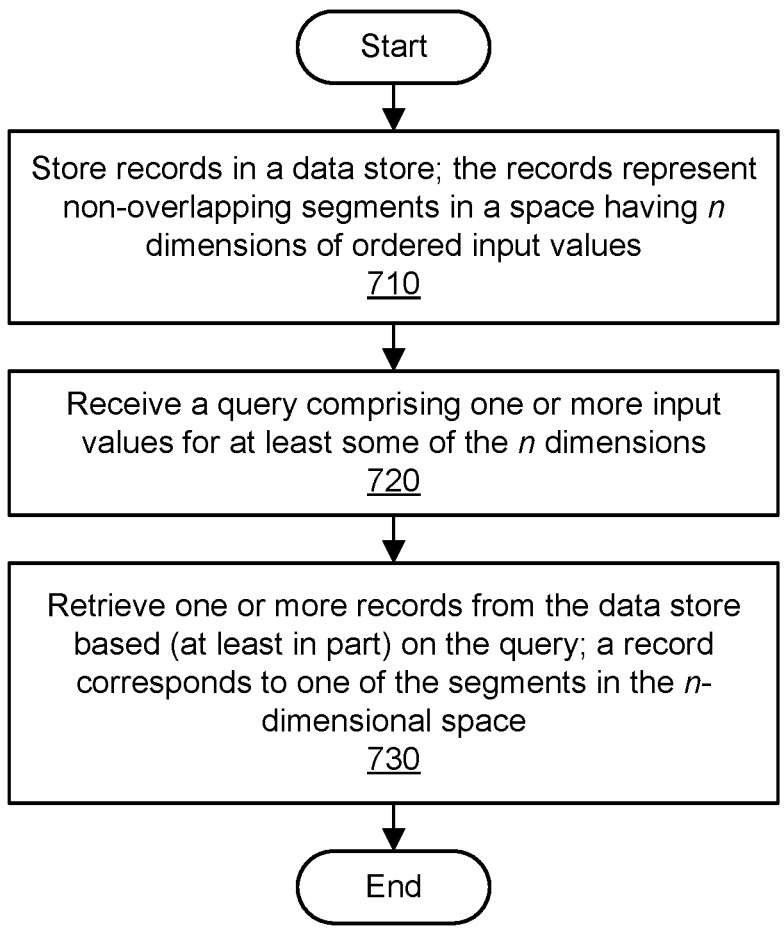
FIG. 7 is a flowchart illustrating a method for retrieving non-sparse high-dimensionality data from a data store in response to a query, according to one embodiment.

FIG. 7 is a flowchart illustrating a method for retrieving non-sparse high-dimensionality data from a data store in response to a query, according to one embodiment. As shown in 710, records may be stored in a data store such that the records represent non-overlapping segments in a space having n dimensions of ordered input values (keys). The operation shown in 710 may be performed as discussed above in FIG. 6.

As shown in 720, a query may be received, e.g., from a client by a storage system that interacts with the data store. The query may comprise one or more input values for at least some of the n dimensions. For example, the query may include or indicate a particular marketplace or region to which a web page request has been directed. As another example, the query may include or indicate a product category for a product whose detail page is requested. As yet another example, the query may include or indicate a device type of the device on which a web page is to be displayed. If any of these values are non-ordinal, the values may be converted to ordinal values. In one embodiment, such a conversion may be performed by the data store by querying a particular view of the underlying data store, where the particular view maps the non-ordinal values (e.g., alphanumeric strings) to the ordinal ones.

As shown in 730, at least one record responsive to the query may be retrieved based (at least in part) on the values indicated in the query. The query may typically return one record if values for all of the n dimensions are supplied (e.g., a particular value for the first dimension, a particular value for the second dimension, and so on). The query may return more than one record if any wildcards or ranges of values are provided for any of the n dimensions. A retrieved record may correspond to one of the disjoint segments of the n-dimensional space. In one embodiment, the record may include configuration data for one or more elements of a web page associated with the input values of the query for the n dimensions. For example, the content of the record may include an indication of whether the element should be included in the page and, if so, its position in the page. The same record may also apply to other values for one or more of the n dimensions that were not supplied in the query, e.g., if those other values represent coordinates in the same segment of the n-dimensional space.

Illustrative Computer System

Figure 8:
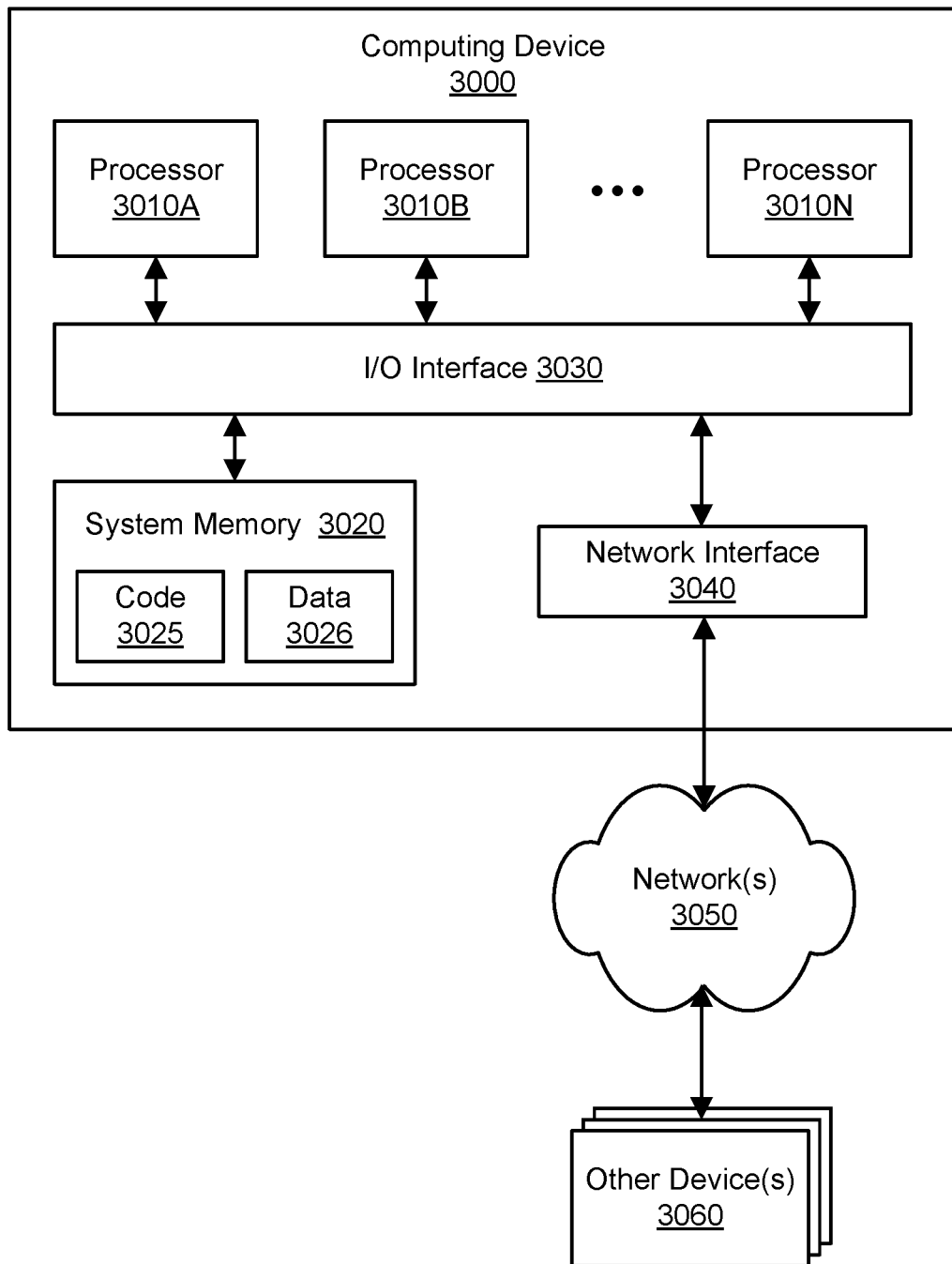
FIG. 8 illustrates an example computing device that may be used in some embodiments.

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via a network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a compact storage system, wherein the compact storage system is configured to:
store a plurality of records in a relational data store, wherein the plurality of records of the relational data store represent a space having n dimensions of ordered values where n is an integer greater than 1, wherein the space is partitioned into a plurality of non-overlapping segments having the n dimensions, wherein individual segments of the plurality of non-overlapping segments have a range of contiguous ordered values for at least one of the n dimensions, wherein the non-overlapping segments comprises non-overlapping rectangles for n=2, non-overlapping rectangular cuboids for n=3, and non-overlapping hyperrectangles for n>3, wherein respective individual ones of the records of the relational data store store data that defines separate respective individual ones of the non-overlapping segments of the n-dimensional space having the range of contiguous ordered values for at least one of the n dimensions, and wherein individual ones of the non-overlapping segments of the n-dimensional space correspond to a single record of the relational data store representing the range of the contiguous ordered values for that individual non-overlapping segment;
receive a query comprising one or more input values for at least some of the n dimensions of the space; and
retrieve at least one record from the relational data store based at least in part on the query, wherein the record retrieved from the relational data store corresponds to a separate one of the non-overlapping segments of the n-dimensional space, and represents a range of contiguous values for at least one of the n dimensions, and wherein the record comprises content responsive to the query.

2. The system as recited in claim 1, wherein the record retrieved from the relational data store represents a range of contiguous values for another of the n dimensions, in addition to the range of contiguous values for the at least one of the n dimensions.

3. The system as recited in claim 1, wherein the record retrieved from the relational data store represents the range within minimum and maximum values for at least the one of the n dimensions.

4. The system as recited in claim 1, wherein the record retrieved from the relational data store indicates whether a display element is part of a page, and, if the display element is part of the page, a position of the display element on the page.

5. A computer-implemented method, comprising:
receiving a query of a data store comprising a plurality of records, wherein the plurality of records of the data store represent a space having n dimensions of ordered values where n is an integer greater than 1, wherein the space is partitioned into a plurality of non-overlapping segments having the n dimensions, wherein individual segments of the plurality of non-overlapping segments have a range of contiguous ordered values for at least one of the n dimensions, wherein respective individual ones of the records of the data store store data that defines separate respective individual ones of the non-overlapping segments of the n-dimensional space having the range of contiguous ordered values for at least one of the n dimensions, wherein individual ones of the non-overlapping segments of the n-dimensional space correspond to a single record of the data store representing the range of the contiguous ordered values for that individual non-overlapping segment, and wherein the query comprises one or more input values for at least some of the n dimensions of the space; and retrieving at least one record from the data store based at least in part on the query, wherein the record retrieved from the data store corresponds to a separate one of the non-overlapping segments of the n-dimensional space, represents a range of contiguous values for at least one of the n dimensions of the space, and comprises content responsive to the query.

6. The method as recited in claim 5, wherein the content in the record retrieved from the data store comprises one or more configuration values for an element of a web page.

7. The method as recited in claim 5, wherein the record retrieved from the data store indicates whether a display element is part of a page, and, if the display element is part of the page, a position of the display element on the page.

8. The method as recited in claim 5, wherein the n dimensions comprise a marketplace or region, a product category for a product, and a device type for which a page for the product is to be generated.

9. The method as recited in claim 5, wherein the record retrieved from the data store represents a range of contiguous values for another of the n dimensions, in addition to the range of contiguous input values for the one of the n dimensions.

10. The method as recited in claim 5, wherein the record retrieved from the data store represents the range within minimum and maximum values for at least the one of the n dimensions.

11. The method as recited in claim 5, wherein the ordered values for the n dimensions comprise ordinal values, wherein the input values in the query comprise a non-numeric value for one of the n dimensions, and wherein, in retrieving the at least one record from the data store, the non-numeric value is mapped to an ordinal value.

12. The method as recited in claim 5, wherein the non-overlapping segments comprises non-overlapping rectangles for n=2, non-overlapping rectangular cuboids for n=3, and non-overlapping hyperrectangles for n>3.

13. A non-transitory computer-readable storage medium storing program instructions computer-executable to perform:

receiving a query of a data store comprising a plurality of records, wherein the plurality of records of the data store represent a space having n dimensions of ordered input values where n is an integer greater than 1, wherein the space is partitioned into a plurality of non-overlapping segments having the n dimensions, wherein individual segments of the plurality of non-overlapping segments have a range of contiguous ordered values for at least one of the n dimensions, wherein respective individual ones of the records of the data store store data that defines separate respective individual ones of the non-overlapping segments of the n-dimensional space having the range of contiguous ordered values for at least one of the n dimensions, wherein individual ones of the non-overlapping segments of the n-dimensional space correspond to a single record of the data store representing the range of the contiguous ordered values for that individual non-overlapping segment, and wherein the query comprises one or more input values for at least some of the n dimensions of the space; and retrieving at least one record from the data store based at least in part on the query, wherein the record retrieved from the data store corresponds to a separate one of the non-overlapping segments in the n-dimensional space, represents a range of contiguous values for at least one of the n dimensions of the space, and comprises content responsive to the query.

14. The non-transitory computer-readable storage medium as recited in claim 13, wherein the content in the record retrieved from the data store comprises one or more configuration values for an element of a web page.

15. The non-transitory computer-readable storage medium as recited in claim 13, wherein the record retrieved from the data store indicates whether a display element is part of a page, and, if the display element is part of the page, a position of the display element on the page.

16. The non-transitory computer-readable storage medium as recited in claim 13, wherein the n dimensions comprise a marketplace or region, a product category for a product, and a device type for which a page for the product is to be generated.

17. The non-transitory computer-readable storage medium as recited in claim 13, wherein the record retrieved from the data store represents a range of contiguous values for another of the n dimensions, in addition to the range of contiguous values for the one of the n dimensions.

18. The non-transitory computer-readable storage medium as recited in claim 13, wherein the record retrieved from the data store represents the range within minimum and maximum values for the at least one of the n dimensions.

19. The non-transitory computer-readable storage medium as recited in claim 13, wherein the ordered values for the n dimensions comprise ordinal values, wherein the input values in the query comprise a non-numeric value for one of the n dimensions, and wherein, in retrieving the at least one record from the data store, the non-numeric value is mapped to an ordinal value.

20. The non-transitory computer-readable storage medium as recited in claim 13, wherein the non-overlapping segments comprises non-overlapping rectangles for n=2, non-overlapping rectangular cuboids for n=3, and non-overlapping hyperrectangles for n>3.

* * * * *